Jan. 5, 1971    I. COOPER ET AL    3,552,980
PACKAGED FOOD PRODUCT AND PROCESS FOR MAKING SAME
Filed Nov. 12, 1969
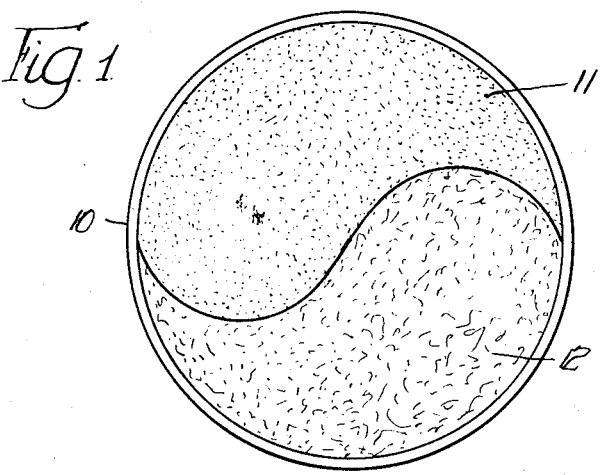
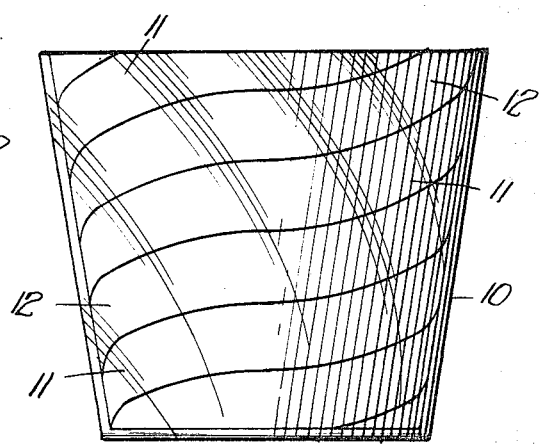
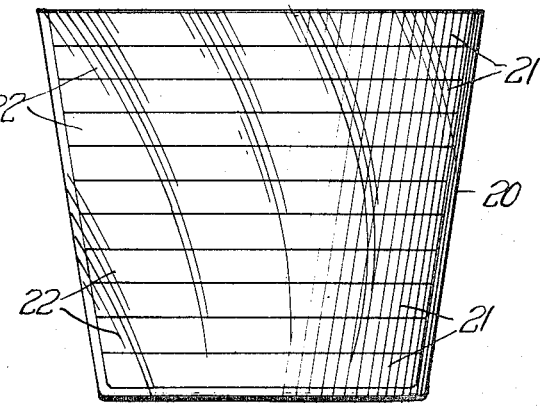
Inventors:
Irwin Cooper,
Edwin L. Sexton,
Daniel Melnick,
Marcus I. Wegner,
By
Attys.

United States Patent Office 3,552,980
Patented Jan. 5, 1971

3,552,980
PACKAGED FOOD PRODUCT AND PROCESS FOR MAKING SAME
Irwin Cooper, Staten Island, N.Y., and Edwin Leon Sexton, Red Bank and Daniel Melnick, Teaneck, N.J., and Marcus I. Wegner, Lanham, Md., assignors to CPC International Inc., a corporation of Delaware
Continuation-in-part of application Ser. No. 594,015, Nov. 14, 1966. This application Nov. 12, 1969, Ser. No. 876,026
Int. Cl. A23l 1/36, 1/38, 1/06
U.S. Cl. 99—128
23 Claims

ABSTRACT OF THE DISCLOSURE

A hydrophilic spread such as peanut butter is packaged in contact with a modified sweet aqueous spread, which is virtually indistinguishable in flavor, texture, spreadability and mouthing characteristics from a conventional jelly, jam, or the like. The modified sweet aqueous spread, which can readily be prepared by modifying a suitable conventional jelly, jam, or the like, has the following composition; from about 10% to about 20% water; from about 10% to about 20% of a non-aqueous edible liquid viscosity reducing agent such as glycerine, the water and viscosity reducing agent being present in an amount of from about 25% to about 35%; from about 10% to about 30% corn syrup solids; the remainder of the spread comprising water-soluble carbohydrates, naturally-occurring fruit solids, plus, if desired, minor amounts of various optional ingredients customarily present in jellies, jams, or the like. The spread is further characterized by less than 50% of the non-aqueous portion thereof comprising carbohydrate materials having a molecular weight of less than 200. The two spreads can be packaged in contact with one another for an indefinite period of time, without any water migrating from the modified sweet aqueous spread into the hydrophilic spread, and without any crystallization of the sugars contained in the modified sweet aqueous spread.

---

This application is a continuation-in-part of our copending application Ser. No. 594,015, filed Nov. 14, 1966, now abandoned.

This invention relates to new food products. More particularly, it relates to stable, packaged peanut butter-base foods such as sandwich spreads, and to methods of making them.

This invention also relates to a process of treating sweet aqueous spreads such as preserves, jams, jellies, and the like, to make them stable against water loss when in contact with a hydrophilic material such as peanut butter, without deleteriously affecting their texture, spreadability, flavor, color and mouthing characteristics.

Various types of preserves, jellies, jams, and confections are ordinarily delicious when freshly mixed with peanut butter. Unfortunately, when sweet, aqueous spreads of this kind are mixed with peanut butter, and the mixture is allowed to stand for a few days, the peanut butter becomes hard, appears dry even though its moisture content has increased, and generally becomes an unattractive brown in appearance and very objectionable in taste. The aqueous spread in the mixture loses its moisture to the peanut butter spread and objectionable sugar crystallization occurs. If the mixture stands for any prolonged period of time, such as, for example, the several-week period that would be typical of transit time and shelf life for peanut butter or the like in a grocery store, the mixture changes so drastically that it is no longer a marketable product. Moreover, mixtures of peanut butter with some materials such as, for example, grape jelly, are very unattractive in appearance and, if thoroughly mixed and then packaged, probably would look too unattractive to be readily saleable even in the fresh state.

One of the most popular sandwich combinations is peanut butter and fruit jelly, such as apple jelly. A stable packaged food product containing a combination of peanut butter and jelly would be a great convenience to the consumer, would be very pleasant to use, and could be packaged in a number of attractive ways. Unfortunately, it has not been possible in the past to make up stable packages of such mixtures.

One object of the present invention is to provide a new, attractive packaged food product.

Another object of the invention is to provide a new packaged food product that is a stable combination of different foods that can be eaten together to provide a delicious taste that is attributable to their combination.

A related object of the invention is to provide a new, attractive, stable packaged food product that includes peanut butter in combination with at least one other different and separate food in the same package, where the food, other than the peanut butter, is a sweet spread that has an appreciable moisture level.

A further object of the invention is to provide a new packaged food spread of the character described, that is stable over prolonged periods of time under practical temperature storage conditions.

Still another object of the invention is to provide a new packaged food product, of good appearance, that includes at least two separate spreads, one of which is peanut butter, and another of which is a modified sweet aqueous spread, that does not change in appearance upon aging, even at the interface between phases, that is stable in flavor over prolonged periods of time under practical temperatures of storage, and that is not susceptible to microbiological spoilage.

A related object of the invention is to provide new, practical techniques for making food products of the character described.

Other objects of the invention will be apparent hereinafter from the description of the invention and from the recitals of the appended claims:

In the drawing:

FIG. 1 is a top plan of an open jar (i.e., a jar with its top removed) containing twin spirals of peanut butter and of a modified sweet aqueous spread, having a strawberry preserve base, made and packed in accordance with one preferred embodiment of this invention, as described in greater detail hereafter in Example I;

FIG. 2 is a side elevation thereof, and

FIG. 3 is a side elevation of an open jar containing alternating layers of peanut butter and of a modified sweet aqueous spread, made and packed in accordance with another preferred embodiment of this invention, as also described in greater detail in Example I.

We have discovered a method of preparing a spread, hereinafter referred to as a "modified sweet aqueous spread," which is virtually indistinguishable from a conventional jelly, jam, preserve, fruit butter, or the like in appearance, flavor, texture, and mouthing characteristics, which can be packaged in direct contact with peanut butter or other such hydrophilic, proteinaceous spread, over long periods of storage, without deterioration of either the modified sweet aqueous spread or the hydrophilic spread. The modified sweet aqueous spread comprises from about 10% to about 90% by weight of the product of our invention, and preferably from about 30% to about 70% of the total product, by weight.

All references hereafter to parts or to percentage compositions are by weight.

The modified sweet aqueous spread should have the following composition:

(1) From about 10% to about 20% water;

(2) From about 10% to about 20% non-aqueous, edible liquid viscosity-reducing-agent (to be defined); the combination of ingredients (1) and (2) being present in an amount of from about 25% to about 35%;

(3) From about 10% to about 30% corn syrup solids (to be defined);

(4) The remainder comprising water-soluble carbohydrates and naturally occurring fruit solids (to be defined) plus, if desired, such optional ingredients as natural or artificial flavoring and/or coloring materials, artificial sweeteners, additional pectin (other than that present in the fruit) or other gelling agents, and the like.

A further requirement of the modified sweet aqueous spread, in addition to the above-listed ingredients, is that less than 50% of the non-aqueous ingredients (i.e. ingredients (2) through (4)) be carbohydrates having a molecular weight of less than 200, e.g. monosaccharides, low molecular weight derivatives of monosaccharides, or polyhydric alcohols.

Ingredient number (2) can be any non-aqueous, edible liquid which will reduce the viscosity of the spread and restore to it the texture and mouthing characteristics of a conventional jelly, jam, or the like. Jellies, jams, and the like customarily contain about 28% to about 32% water. As will be discussed more fully hereinafter, the preferred method of preparing the spread is to employ a conventional jelly or the like as the starting material and modify it appropriately. However, a jelly or similar spread having a water content of between 10% and 20% is quite viscous, i.e. it has an objectionably heavy body and does not have the spreadability and mouthing characteristics generally associated with products of this type. Therefore, to restore to the spread the viscosity, body, spreadability and mouthing characteristics of a conventional spread an appropriate amount of a viscosity reducing agent is added. The essential characteristics of the viscosity reducing agent are that it be edible (obviously), liquid, non-aqueous, water-miscible, and capable of restoring the body, mouthing characteristics, etc. of the spread to their original state. Also, it should not have a strong or objectionable flavor which would mask or interfere with the flavor of the spread. Suitable viscosity reducing agents are glycerine and the edible liquid glycols such as propylene glycol. For reasons of economy and availability glycerine is preferred.

The amount of viscosity reducing agent used will vary from about 10% to about 20% of the final modified sweet aqueous spread, the latter with a total moisture content ranging from about 10% to about 20%. The combination of these liquid materials (a non-aqueous viscosity reducing agent and water) in the final modified sweet aqueous spread ranges from about 25% to about 35%. Using the minimum concentrations of each of the two types of liquids set forth (i.e. 10% moisture, 10% non-aqueous liquid) is inadequate to give a satisfactory spread since it is then undesirably stiff, generally sticky and dry. The minimum concentration of the combination of the aqueous and non-aqueous liquids must therefore be about 25% of the final modified sweet aqueous spread. Conversely, using the maximum concentrations of each of the individual liquid components gives an unacceptable product; the modified sweet aqueous spread is then too thin, resulting in flow characteristics that are undesirable. Such a modified sweet aqueous spread, when packaged according to the teaching of this invention, will run off and drain to the bottom of the container as the product is in use. The concentration of the combination of aqueous and non-aqueous liquids must therefore be no greater than about 35% of the final modified sweet aqueous spread.

By the term "corn syrup solids" (ingredient number (3)) is meant those products, measured on a dry basis, derived from the hydrolysis of corn starch or related starches, such as milo starch, by acid and/or enzyme catalysis, whereby the starch is hydrolyzed to a "dextrose equivalent" (D.E.) ranging from about 10 to about 70. Those corn syrup solids having a D.E. in the range of about 10 to about 20 are preferred.

The corn syrup solids are present in the spread in an amount of within the range of from about 10% to about 30%, based on the total weight of the spread. The purpose of the corn syrup solids is twofold. First, because of their hydrophilic nature, they act to "bind up," or hold, the water present in the spread and thereby prevent its migration into the hydrophilic spread (e.g. peanut butter). Second, they inhibit the crystallization of the other sugars (e.g. sucrose) present in the spread, which crystallization would normally take place rapidly in a jelly or jam with a water content of 10% to 20%.

The remainder of the modified sweet aqueous spread comprises those materials ordinarily present in fruit jellies, fruit jams, fruit preserves, fruit butters, fruit sauces (e.g. apple sauce or cranberry sauce), and similar fruit-based, spreadable foodstuffs. These materials are primarily naturally occurring fruit solids (i.e. those solid materials present in fruit juice, plus fruit pulp if the product is a jam or the like) and additional water-soluble carbohydrates such as sucrose. Other optional ingredients can also be present, e.g. additional pectin or other gelling agents if necessary, natural or artificial flavoring agents, natural or artificial coloring materials, preservatives, synthetic sweeteners, etc.

The exact process employed in the preparation of the modified sweet aqueous spread is immaterial, the only requirement being that the finished product have the composition set forth and have a spreadable, semi-solid consistency typical of jellies, jams, fruit butters and sauces, etc. The simplest, and therefore preferred, method of preparation is to start with a suitable conventional jam, jelly, or the like and modify it to form the composition of the invention. By the term "conventional" jam, jelly, or the like is meant any such product customarily so identified, either "home made" or commercially prepared. Commercial fruit jellies, jams, preserves and butters, including the artificially sweetened type, must necessarily meet the standards set by the Food and Drug Administration. By the term "suitable" conventional jam, etc. is meant a product having such composition that it can be modified to the composition of the sweet aqueous spread of the invention.

The following discussion will illustrate the foregoing remarks, and will also illustrate various methods of practicing the invention.

Taking fruit jelly as an example, the FDA standards (Code of Federal Regulations Title 21, Chapter 1, Section 29.2) define fruit jelly as a gelled food made from a mixture composed of not less than 45 parts fruit juice to each 55 parts of an approved saccharine ingredient, which mixture may also contain specified optional ingredients. Among the saccharine ingredients are the following: (1) sucrose; (2) invert sugar syrup; (3) any combination of (1) and (2); (4) dextrose in combination with (1), (2) or (3); (5) corn syrup solids or the like (40 D.E. or higher) in combination with (1), (2), (3) or (4), provided the combination comprises no more than 25% corn syrup solids; (6) honey; (7) certain combinations of honey and (1), (2) or (3).

First, assume the starting material to be a jelly prepared by combining 45 parts fruit juice (containing about 15% solids) and 55 parts sucrose, and cooking to a final moisture content of about 28%. The jelly will have approximately the following composition:

| | Percent |
|---|---|
| Water | 28 |
| Sucrose | 64 |
| Fruit solids | 8 |
| | 100 |

The jelly could be modified to form a modified sweet aqueous spread in accordance with the invention by merely adding appropriate amounts of corn syrup solids and glycerine. For example, combining 50 parts of the jelly with 25 parts corn syrup solids and 15 parts glycerine would result in a spread having the following approximate composition:

| | Percent |
|---|---|
| Water | 15.5 |
| Sucrose | 35.6 |
| Fruit solids | 4.4 |
| Corn syrup solids | 27.8 |
| Glycerine | 16.7 |
| Monosaccharides | 0.0 |
| | 100.0 |

Water plus glycerine: 32.2%
Percentage of non-aqueous portion consisting of materials having a molecular weight not greater than 200: 19.8 (glycerine only)

An apparent error in the above figures will readily be observed, i.e. the fact that the figures show no monosaccharides to be present. It is known, of course, that fruit solids consist primarily of sugars, both mono- and disaccharides. It is also known that during the manufacture of fruit jelly or the like, and also during storage of the finished product, a certain amount of inversion of the sucrose to dextrose and levulose takes place, the amount of inversion depending upon the acidity of the environment. With respect to the monosaccharides contributed by the fruit solids, the amount, which will depend upon the particular fruit employed, is insignificantly small and therefore can be ignored. As to the amount of monosaccharides produced by inversion, this is immaterial to the practice of the invention, the important consideration being the amount and nature of the saccharine ingredients put into the initial jelly formula or later added to the jelly during the modification of same to form the modified sweet aqueous spread. Therefore, when we refer to the proportion of monosaccharides or other carbohydrates of molecular weight not greater than 200 (and we use the term "carbohydrates" in its broad sense, to include such polyhydric alcohols as glycerine and glycols), it should be understood that this refers to the carbohydrates as originally used in the formulation of the jelly or modified sweet aqueous spread, and not as formed through inversion.

As a second illustration, assume the jelly to have been prepared as in the first illustration, with the addition of 55 parts of a saccharine ingredient to 45 parts of fruit juice, but with the saccharine ingredient comprising 25% corn syrup solids and 75% sucrose. The composition of the jelly will then be:

| | Percent |
|---|---|
| Water | 28 |
| Sucrose | 48 |
| Corn syrup solids | 16 |
| Fruit solids | 8 |
| | 100 |

This jelly could readily be modified to form the spread of the invention by simply removing a suitable portion of the water and replacing it with a viscosity reducing agent such as glycerine. If, for example, the water is reduced to 15% and glycerine added in an amount equal to the water removed, the spread will have the following composition:

| | Percent |
|---|---|
| Water | 15 |
| Sucrose | 48 |
| Friut solids | 8 |
| Corn syrup solids | 16 |
| Glocerine | 13 |
| Monosaccharides | 0 |
| | 100 |

Water plus glycerine: 28%
Percentage of non-aqueous portion consisting of materials having a molecular weight not greater than 200: 15.3%

As a third illustration, assume the jelly to have been prepared using invert syrup as the sole saccharine ingredient, and further assume invert syrup to comprise only monosaccharides. The composition of the jelly will then be as follows:

| | Percent |
|---|---|
| Water | 28 |
| Monosaccharides | 64 |
| Fruit solids | 8 |
| | 100 |

This jelly could not be used as a starting material in the practice of the invention, because it would be virtually impossible to modify it in such a way as to produce a modified sweet aqueous spread in which the non-aqueous portion contained less than 50% carbohydrates having a molecular weight of 200 or less.

Frequently, during the preparation of the modified sweet aqueous spread, excess air is introduced into the spread (e.g. during the incorporation of the corn syrup solids and/or the viscosity reducing agent into the jelly or the like), which will cause the spread to lose the smooth translucent appearance generally associated with jams, etc. If this occurs it is highly desirable to deaerate the product, as by subjecting it to a vacuum, to restore the original "jelly like" appearance.

Once the modified sweet aqueous spread has been prepared, it can be packaged in direct contact with a hydrophilic spread such as peanut butter. It should be noted that no treatment of the hydrophilic spread itself is necessary. No migration of water occurs across the interface between the two phases, or, if there is migration, it is minimal and not detectable organoleptically. When peanut butter is used as the hydrophilic spread, no darkening or stiffening of the peanut butter or flavor defects are noted at the interface, and no crystallization of the sugars in the modified sweet aqueous spread will occur during extended periods of storage of up to 5 months in the temperature range of 45° F. to 95° F. or during use by the consumer.

By the term "hydrophilic spread" is meant any food material that has a spreadable consistency and that has a relatively high content of protein and carbohydrate (both hydrophilic materials) and of fat, and that is essentially moisture-free having a low water content (about 4% or less). Typical of these spreads are the well known nut butters such as peanut butter, as well as other spreads and sandwich fillings that are hydrophilic in character and that have low moisture contents. Examples of the latter are compounds of skim milk solids with carbohydrates and fats, with or without flavorings and colors to provide spreads with the same usage as the nut butters. Following the addition of water in limited amounts, these hydrophilic spreads are all characterized by becoming firm, appearing dry (even though their moisture content has increased) and objectionable in taste within a short period of time (viz several days). On the further addition of moisture, these products will thin out but flavor stability will still be poor and now microbiological hazards will be introduced.

The fact that a hydrophilic spread such as peanut butter does not stiffen or increase in viscosity when placed in direct contact with a modified sweet aqueous spread treated in accordance with our invention is totally unexpected. It is known, of course, that water or a water-containing material such as conventional jelly will, when placed in contact with peanut butter, cause the peanut butter to stiffen. It is also known that the addition of glycerine to peanut butter results in greater oil retention of the peanut solids and thereby increases the viscosity of the peanut butter. It is further known that a dry pulverulent material such as corn syrup solids or the like also has a drying and stiffening effect on peanut butter. It is totally unexpected, therefore, that a modified sweet aqueous spread, prepared in accordance with our invention, and containing water, glycerine and corn syrup solids, can now be packed in direct contact with peanut butter for an extremely long period of time without causing any stiffening or increased viscosity of the peanut butter. Also of importance are the observations that no darkening of the peanut butter or objectionable flavors develop when this hydrophilic spread is in contact with our modified sweet aqueous spread.

The hydrophilic spread can be any spreadable food that is characterized by a moisture content of less than 4%, that contains about 15 to about 35% protein, about 30 to about 55% by weight of fat, and the remainder being essentially carbohydrate solids, except for the coloring and flavoring agents (including salt) that may be added. Nut butters, nut butter products, nut spreads, and composites of milk solids, of soy flour, of protein isolates, singly and in combinations along with carbohydrates and fats are all satisfactory. Peanut butter is a preferred material.

The conventional process for making peanut butter comprises the steps of roasting shelled peanuts, cooling and blanching the peanuts, removing the nibs, hand picking the objectionable peanuts for discard, grinding the peanuts that passed inspection, mixing in the sugar and salt flavorings, and then regrinding. During the roasting of the peanuts, the moisture content is reduced so that the final product will contain less than 4% moisture. In making the stabilized peanut butters now on the market, a hydrogenated component described below is introduced prior to the last grinding operation. About 92.5% of the product (90-95%) is ground roasted peanuts. The protein content of conventional peanut butter is about 29% (27-32%; NX6.25) and the oil content is about 50% (48-52%).

Conventional peanut butters in the past consisted of ground roasted peanuts and sugar (dextrose and/or sucrose) and salt flavorings. Because this product exhibits gravitational instability (oil layer separating on top of the product), it has become regular practice to add a relatively high melting fat component to the hot peanut butter (about 170° F.), at some time prior to the filling of the product into jars. This high melting fat component usually has a melting point in excess of 110° but less than 160° F. and may be: a partially hydrogenated fat, a completely hydrogenated fat, mono- (and di-) glyceride esters of the unsaturated fatty acids, or mixtures of these firming up agents. These high melting fat components, when added in small amounts (viz 1-3% of the peanut butter), may be introduced as a supplement to the ground roasted peanuts or when added in larger amounts (viz 5-10% of the peanut butter) may be introduced after an equivalent amount of the liquid peanut oil in the ground roasted peanuts has been removed. The added hard fat sets up as continuous or semi-continuous stearine structure within the final supercooled peanut butter during the holding of the product at room temperature and in so doing prevents oil from separating from the peanut butter. During this period the peanut butter, packed originally as a supercooled flowable product, changes to a non-flowable but still spreadable product. The sugar and salt flavorings are added in peanut butter manufacture in total amount usually less than 10%. Liquid non-hydrogenated vegetable oil is frequently added to the mixture in amounts up to about 5%. Since ground roasted peanuts consist of about 50% peanut oil and 50% non-fat peanut solids, we estimate the quantity of ground roasted peanuts in peanut butter by multiplying the non-fat peanut solids by 2. Thus a product with 46.25% non-fat peanut solids would characterize a peanut butter made from 92.5% ground roasted peanuts.

While it is preferred to practice the present invention with the use of a stabilized peanut butter as the hydrophilic spread, old fashioned peanut butter (not stabilized) can also be used, provided the supercooled finished product is refrigerated immediately after packaging and distributed and used thereafter in the refrigerated state. Under such circumstances, oil separation in the peanut butter will not occur. Peanut butter products that are sweetened to make them particularly attractive to children, peanut butter products that are protein enriched, and peanut butter products that include moisture-free foods and flavorings other than ground nuts can also be used as the hydrophilic spread.

In packaging the modified sweet aqueous spread and the hydrophilic spread together, it is preferred to use twin nozzles, each nozzle to inject a stream of one of the two spreads into the package, such as a glass jar. The use of twin nozzles permits the two streams to be dispensed into a rotating glass jar as twin spirals, for example, which permits filling the package with separate and alternating helices of the different spreads; the end product has a very attractive appearance simulating that of a barber pole. Other attractive packaging techniques can also be employed such as, for example, alternating layers of the two spreads. The hydrophilic spread must be flowable for proper packaging and adequately chilled (supercooled) to provide a rapid set in the jar thereby keeping the two spreads separate from each other.

The invention will now be further illustrated by reference to specific examples thereof.

EXAMPLE I

Commercially purchased strawberry preserves, which had been prepared initially by combining 45 parts strawberries, 55 parts sucrose, and minor amounts of pectin and citric acid, and cooking the mixture to a composition having 28% moisture, were used as the starting material. The preserves were ground to reduce the pieces of fruit to tiny particle sizes. 55 parts of the ground preserves, 27 parts of corn syrup solids having a D.E. within the range of about 10 to about 20, and 18 parts of glycerine were intimately blended together, and the blend was heated to 160° F. The mixture was then deaerated and cooled to about 90° F. At this point, the modified sweet aqueous spread had a moisture content of 15.4% by weight. The combination of moisture and glycerine totalled 33.4%.

This modified sweet aqueous spread was then delivered through one of two twin nozzles into glass jars, while a smooth texture, supercooled but still flowable, stabilized peanut butter (92.5% ground roasted peanuts) was delivered through the second nozzle. The jars were each rotated as they were filled, so that the peanut butter and modified sweet aqueous spread were disposed in twin spirals within each jar.

Each jar had the appearance shown in FIGS. 1 and 2 of the drawing. The numeral 10 refers to the jar. The spiral 11 of the modified sweet aqueous spread, together with the spiral 12 of peanut butter, fill the jar, and are in contact with each other over their broad, confronting, engaged surfaces.

The jars were sealed and stored after filling. No change was observed in the contents after aging for periods of time within the normal expected supermarket shelf time of four to six months. The spirals of modified sweet aqueous spread and of the peanut butter showed no characteristics of dehydration or of hydration respectively. The modified sweet aqueous spread remained translucent and of good color and free of any evidence of sugar crystallization even when the combined product was stored for months on end in the refrigerator at 45° F. The peanut butter showed no hardening or browning whatsoever and the absence of such undesirable changes was noted even at the interphase despite storage even at elevated temperature (viz 95° F.). The flavor of each spread was characteristic and comparable to the flavor it would have if stored separately in its own jar.

The contents were easily removed by knife or spoon, were easily spreadable, and were delicious alone or spread on either crackers or bread. The flavor of the mixture of the two phases was appealingly sweet, and the separate flavors and textures of each of the two phases were readily discernible.

Equally satisfactory results were obtained when the modified sweet aqueous spread was packed, in twin spiral form, with stabilized peanut butters of regular (creamy) and of chunky textures respectively.

In another demonstration of the invention with the same modified sweet aqueous spread and with a smooth texture stabilized peanut butter, filling was in alternating fashion, so that first the supercooled peanut butter flowed into the container, then the peanut butter flow stopped, and modified sweet aqueous spread flowed into the container, on top of the set-up peanut butter and so on. Each jar was held stationary as it was filled. Each filler jar contained alternating layers of peanut butter and of modified sweet aqueous spread, as shown in FIG. 3, where the numeral 20 denotes the jar, and the layers 21 are peanut butter, and the alternate layers 22 are modified sweet aqueous spread. The same satisfactory characteristics of stability, delicious taste, spreadability, good mouthing, and attractive appearance were observed.

EXAMPLE II

Commercially purchased pineapple preserves were used as the starting material. The preserves had been prepared in a manner similar to that of the strawberry preserves of Example I, except that pineapple had been substituted for the strawberries, and the saccharine ingredient had been a blend of 25% invert sugar and 75% sucrose.

First, the moisture content of the preserves was reduced to about 18% by weight by evaporation under moderate vacuum in a wiped film evaporator. Then, corn syrup solids derived from the hydrolysis of milo starch, having a D.E. of about 15, were added to reduce the moisture content further to about 14%. Glycerine was then added to the batch while maintaining the vacuum and the batch was mixed carefully, still under vacuum, to complete the deaeration and to obtain uniform composition throughout. The modified sweet aqueous spread had an appearance, color, flavor, viscosity and eating characteristics very similar to that of the initial preserve. The modified sweet aqueous spread had the following composition:

MODIFIED SWEET AQUEOUS SPREAD

| Ingredients: | Percent by weight |
|---|---|
| Solids from the original pineapple preserves | 53 |
| Water remaining | 12 |
| Corn syrup solids (15 D.E.) | 18 |
| Glycerine | 17 |
| Total | 100 |

The modified preserve (modified sweet aqueous spread) was then permitted to cool in a holding tank, to a point where it was still easily pumpable. The modified preserve was then delivered through a nozzle into glass jars, at the same time that a second nozzle was used to direct a smooth textured, supercooled, stabilized (90% ground roasted peanuts) peanut butter into the same jars. The jars were each rotated as they were filled, so that the peanut butter and modified preserve were disposed in twin spirals within each jar.

The jars were then sealed and stored. The results were equally satisfactory as the results obtained in Example I.

EXAMPLE III

A compounded hydrophilic spread was made up as follows:

COMPOUNDED HYDROPHILIC SPREAD

| Components: | Percent by weight |
|---|---|
| Non-fat dry milk powder (250 mesh) | 19.5 |
| Casein-Lactalbumin fusion product (Ca-Sal of 200 mesh, 85% protein content obtained from Crest Food Products) | 15.5 |
| Flour salt | 0.5 |
| Corn syrup solids (10–20 D.E.) | 20.5 |
| Peanut oil | 42.0 |
| Hydrogenated cottonseed stearine (M.P.=140° F.) | 2.0 |

The peanut oil and stearine were heated together to 150° F. Ethyl vanillin (0.005%) and carotene (equivalent to 6000 units of Vitamin A per pound of product) were dissolved or dispersed in the oil. The mixed dry ingredients were then stirred in. The mixture was deaerated and was then supercooled in an agitated heat exchanger, to 80° F.

It was still flowable and was then packed in spiral fashion into glass jars with a modified sweet aqueous spread like that of Example I except with grape jelly replacing the strawberry preserve of Example I, and the modified sweet aqueous spread now containing 19% by weight of propylene glycol in place of the 18% glycerine. The combination of moisture and viscosity reducing agent in this spread totalled 34.4% by weight. The jars were then sealed and stored. No change was observed in the contents after aging for periods of time covering a four months observation period with exposure temperatures ranging from 45° F. to 95° F. The modified jelly showed no signs of dehydration and the compounded hydrophilic phase showed no signs of hydration, i.e. no detectable moisture transfer between phases occurred.

The contents were spoonable, were easily spread, and were delicious alone or on crackers or bread. The flavor of each phase was appealingly sweet, and the separate flavors and textures of the two phases complemented each other. The product did not require refrigerated storage and was not susceptible to microbiological spoilage.

EXAMPLE IV

The procedure described above in Example I was modified in another demonstration of the invention. The ground strawberry preserves were heated under vacuum to remove roughly about half of the water present in the preserves (12% weight reduction). These partially dehydrated preserves were then used in the following formulation:

MODIFIED SWEET AQUEOUS SPREAD

| Ingredients: | Percent by weight |
|---|---|
| Partially dehydrated ground strawberry preserves (18% moisture) | 74.8 |
| Corn syrup, 42 D.E. (20% moisture) | 14.0 |
| Glycerine | 11.2 |

These components were blended and heated to 160° F., deaerated, and then cooled to about 90° F. The moisture content of this modified, sweet aqueous spread was 16.3% by weight and the combination of moisture and viscosity reducing agent totalled 27.5%

The modified preserves were then packaged with peanut butter in the manner described in Example I. The product was highly satisfactory in all regards.

EXAMPLE V

The procedure of Example IV was modified in another demonstration of the invention. The partially dehydrated strawberry preserves of Example IV were employed in the following formulation:

MODIFIED SWEET AQUEOUS SPREAD

| Ingredients: | Parts by weight |
|---|---|
| Partially dehydrated pulverized strawberry preserves (18% moisture) | 77.0 |
| Corn syrup solids (10–20 D.E.) | 11.5 |
| Glycerine | 11.5 |

These materials were blended and heated to about 160° F., deaerated, and cooled. The modified sweet aqueous spread so obtained was packed as in Example I with a smooth texture, stabilized, supercooled peanut spread (82.5% ground roasted peanuts), at a temperature of about 90° F. The product was highly satisfactory. The moisture content, by analysis, of the modified fruit preserve phase, as packaged, was 14.6%, and the combination of moisture and viscosity reducing agent totalled 26.1% by weight.

Equally good results are obtained when the modified sweet aqueous spread is prepared fom a material such as, for example, fruit butter, fruit-flavored syrups, fruit sauces, and the like, modified to have a final water content in the range of from about 10% to about 20% by weight thereof, a non-aqueous liquid viscosity reducing agent in an amount of from about 10% to about 20% by weight thereof, the combined amount of water and viscosity reducing agent being within the range of from about 25% to about 35%, and a sufficient content of corn syrup solids (within the range of from about 10% to about 30%) to provide sufficient water retentativeness to negate the aqueous absorptive attraction of any of the hydrophilic spreads which constitute one of the components of this invention.

Products made in accordance with this invention are especially attractive to children, particularly when made and packaged in the form of twin spirales of peanut butter and modified preserves. A sandwich made from the product of the invention is indeed superior, from a utility standpoint, to a sandwich prepared using peanut butter and preserves from separate jars. Not only does the present invention permit the convenience of packaging the two different phases in a single container under conditions where the contents are stable over prolonged periods of time, but in one single application, both phases are applied to the bread slice. In peanut butter, the external phase is fat or oil; in preserves, the external phase is water. Since water and oil do not readily mix, it is virtually impossible for a child to apply peanut butter on bread which has already been coated with preserves. Only when a preserve or jelly is thin enough in viscosity, can a child readily apply it on top of peanut butter which has been spread on bread. The smart youngster goes for a double-decker sandwich, one slice of bread covered with peanut butter, and the other covered with jelly or preserves. With the product of our invention, we discovered that the two phases are far more compatible in viscosity, spreadability and handling characteristics than are the presently commercially available peanut butters and jams as packed in separate jars. With the products of the present invention, a child can spread a single slice of bread with both peanut butter and the modified jam at the same time, and during this application, the two phases do not separate from each other but blend somewhat, into a highly desirable and attractive marbleized appearance. This provides even an open sandwich which contains both components, each contributing its own distinctive flavor, texture and color; in addition, the sweet aqueous spread operates to cut down on the stickiness in the mouth of the peanut butter phase.

We claim:

1. A stable, packaged, spreadable food product comprising at least two separate, discrete spreads that are in contact with each other over confronting, engaging surfaces:
   one of said spreads comprising a hydrophilic spread which is essentially moisture-free and which contains protein, carbohydrate, and fat; and
   a second of said spreads being a modified sweet aqueous spread comprising:
   from about 10% to about 20% water;
   from about 10% to about 20% of a non-aqueous, edible liquid viscosity reducing agent;
   the combination of water and viscosity reducing agent being present in an amount of from about 25% to about 35%;
   from about 10% to about 30% corn syrup solids; aqueous portion thereof consisting of carbohydrates and naturally occurring fruit solids;
   the modified sweet aqueous spread having the further characteristic of less than 50% of the non-aqueous portion thereof consisting of carbohydrates having a molecular weight of less than about 200.

2. A food product in accordance with claim 1 wherein one spread comprises from about 10% to about 90% by weight of the food product.

3. A food product in accordance with claim 1 wherein one spread comprises from about 30% to about 70% by weight of the food product.

4. A food product in accordance with claim 1 wherein the modified sweet aqueous spread comprises a modified fruit jam.

5. A food product in accordance with claim 1 wherein the modified sweet aqueous spread comprises a modified fruit jelly.

6. A food product in accordance with claim 1 wherein the modified sweet aqueous spread comprises modified fruit preserves.

7. A food product in accordance with claim 1 wherein said viscosity reducing agent is a non-aqueous edible liquid selected from the group consisting of glycerine, glycols, and mixtures thereof.

8. A food product in accordance with claim 1 wherein said hydrophilic spread contains by weight about 15% to about 35% protein, about 30% to about 55% of fat, and the remainder essentially carbohydrate solids.

9. A food product in accordance with claim 8 wherein said hydrophilic spread comprises a nut butter product.

10. A food product in accordance with claim 9 wherein said hydrophilic spread comprises peanut butter.

11. A food product in accordance with claim 1 wherein said corn syrup solids have a D.E. within the range of about 10 to about 70.

12. A food product in accordance with claim 1 wherein said corn syrup solids have a D.E. within the range of about 10 to about 20.

13. A process for modifying a sweet, semi-solid, fruit-based spread, which spread has been prepared by cooking together fruit and a saccharine ingredient, wherein a major portion of said saccharine ingredient comprises carbohydrate material having a molecular weight in excess of about 200, in order to inhibit the release of water from the spread when it is in contact with a hydrophilic food material, comprising:
   adjusting the water content of the spread to a final concentration of from about 10% to about 20% by weight;
   adjusting the amount of corn syrup solids present in with spread to from about 10% to about 30% by weight;
   adding to said spread an edible, non-aqueous liquid viscosity reducing agent in an amount of from about 10% to about 20% by weight, the combination of water and viscosity reducing agent being present in an amount of from about 25% to about 35% by weight; and
   deaerating the modified sweet aqueous spread to restore the translucent appearance of the spread.

14. A process in accordance with claim 13 wherein the original, unmodified spread contains corn syrup, and wherein the water content and corn syrup solids content of the spread are adjusted by removing a part of the water from the spread.

15. A process in accordance with claim 13 wherein the water content and the corn syrup solids content of the spread are adjusted by incorporating into said spread a sufficient amount of corn syrup solids to bring the concentration of corn syrup solids in the final modified spread to an amount of from about 10% to about 30% and the water content of the final modified spread to an amount of from about 10% to about 20%.

16. A process in accordance with claim 13 wherein said sweet semi-solid spread is selected from the group consisting of fruit jelly, fruit jam, fruit preserves, fruit butters, and fruit sauces.

17. A process in accordance with claim 13 wherein said corn syrup solids have a D.E. within the range of from about 10 to about 20.

18. A process for making a stable, packaged, spreadable food product comprising at least two separate, discrete spreads that are in contact with each other over confronting, engaging surfaces comprising:
  injecting into a container separate streams of the different spreads, in such a fashion as to fill the container with said separate streams; wherein
  at least one of said streams comprises a supercooled and still flowable hydrophilic spread that is essentially moisture-free and that contains protein, carbohydrate, and fat; and
  at least a second of said streams comprising a modified sweet aqueous spread comprising:
    from about 10% to about 20% water;
    from about 10% to about 20% of a non-aqueous, edible liquid viscosity reducing agent;
    the combination of water and viscosity reducing agent being present in an amount of from about 25% to about 35%;
    from about 10% to about 30% corn syrup solids;
    the remainder comprising water-soluble carbohydrates and naturally-occurring fruit solids;
    said modified sweet aqueous spread having the further characteristic of less than 50% of the non-aqueous portion thereof consisting of carbohydrates having a molecular weight of less than about 200.

19. A process in accordance with claim 18 wherein the streams are injected simultaneously and so directed into the container as to form spirals therein.

20. A process in accordance with claim 18 wherein the corn syrup solids have a D.E. within the range of from about 10 to about 20.

21. A process in accordance with claim 18 wherein the streams are injected alternately and are so directed into the container as to form alternating layers.

22. A process in accordance with claim 18 wherein said hydrophilic spread is peanut butter.

23. A process in accordance with claim 18 wherein said modified sweet aqueous spread is a member selected from the group consisting of modified fruit jelly, modified fruit jam, modified fruit preserves, modified fruit butters, and modified fruit sauces.

References Cited

UNITED STATES PATENTS 3,278,314  10/1966  Colby et al. _____ 99—128

A. LOUIS MONACELL, Primary Examiner

R. M. ELLIOTT, Assistant Examiner

U.S. Cl. X.R.

99—101, 129

PO-1050
(5/69)

UNITED STATES PATENT OFFICE
CERTIFICATE OF CORRECTION

Patent No. 3,552,980            Dated January 5, 1971

Inventor(s) Irwin Cooper, E. L. Sexton, D. Melnick and Marcus I. Wegn

It is certified that error appears in the above-identified patent and that said Letters Patent are hereby corrected as shown below:

Column 6, line 10, "Glocerine" should read ---Glycerine---;

Column 9, line 30, "filler" should read ---filled---;

Dolumn 11, line 4, "Parts by weight" should read ---% by weight---;

Column 11, line 21, "fom" should read ---from---;

Column 11, line 37 "spirales" should read ---spirals---;

Column 12, line 11, "aqueous portion thereof consisting of carbohyd: and naturally occuring fruit solids" should read ---the remainder comprising water-soluble carbohydrates and naturally occuring fruit solids ---.

Signed and sealed this 28th day of September 1971.

(SEAL)
Attest:

EDWARD M. FLETCHER, JR.
Attesting Officer

ROBERT GOTTSCHALK
Acting Commissioner of P